United States Patent Office 3,079,354
Patented Feb. 26, 1963

3,079,354
EPOXY RESIN ESTERS CONTAINING TUNG
OIL FATTY ACIDS
Leo A. Goldblatt and Lucien L. Hopper, Jr., New Orleans, La., assignors to the United States of America as represented by the Secretary of Agriculture
No Drawing. Filed Oct. 30, 1957, Ser. No. 693,493
14 Claims. (Cl. 260—18)

A non-exclusive, irrevocable, royalty-free license in the invention herein described, throughout the world for all purposes of the United States Government, with the power to grant sublicenses for such purposes, is hereby granted to the government of the United States of America.

This invention relates to a process for incorporating drying oil fatty acids in typical vic-epoxy resin esters by modified vehicle cooking methods in combination with catalytic amounts of zinc resinate. More particularly, this invention relates to a process for incorporating substantial amounts of tung oil fatty acids in such epoxy resins. Zinc resinate in this process functions as an esterification catalyst or as an ester interchange catalyst. The tung oil fatty acid epoxy resin esters of this invention retain about half of the conjugated triene originally present in the tung oil derivative from which they are prepared. Protective coating films from the products of this invention exhibit outstanding adhesion, high chemical resistance, unusual flexibility, and the extreme hardness usually associated with esters derived from the epoxy resins and long chain fatty acids. The presence of tung oil fatty acids in the epoxy resin is made manifest by a generally more rapid air drying of the coating films, a lesser requirement for metallic drier, increased film hardness, resistance to water, alkali, and strong organic solvents.

An object of this invention is the preparation of paint and varnish vehicles comprising epoxide esters which contain tung oil fatty acids in amounts as high as 0.5 equivalent weight of tung oil fatty acid per one equivalent weight of vic-epoxide. The epoxide resin esters which are the subject of this invention are film formers and produce "gas-proof" protective coatings (coatings which dry clear, hard, smooth, and glossy, even in atmospheres deficient in oxygen) characterized by an inherent ability to dry rapidly in air with conventional metallic paint drier added. These epoxide esters can also be used as vehicles to produce baking coatings with or without metallic paint drier added. The baking coatings produced by the vehicles prepared according to this invention are, like the air drying films, characterized by extreme toughness, flexibility, tenacious adherence to the protective surface (wood, metal or glass), unusual water and alkali resistance, and excellent resistance to powerful organic solvents. The epoxide resin esters containing tung oil which are the subject of this invention are also useful as vehicles for the production of baking varnishes and enamels, which varnishes and enamels contain in addition to the epoxy tung oil fatty acid esters, melamine, or melamine and pigment. The baking varnishes and enamels exhibit all the desirable film forming properties that characterize the coating films without melamine and without pigment Water and alkali resistance, organic solvent resistance, film toughness, flexibility, and film adherence to the coated surface is superior. The vehicles prepared according to the processes of this invention exhibit in addition, the property of enhanced pigment "wetting" so that "grinding-in" of pigments during the preparation of enamels is carried out quickly and with ease.

A tung oil or tung oil fatty acid containing vehicle, in order to produce a protective film that will dry wrinkle free, clear, and unfrosted must be "gas-proof." The minimum temperature at which any tung oil or tung oil fatty acid containing vehicle may be cooked and yet yield a "gas-proof" coating film is about 250° C. Normally, a tung oil or tung oil fatty acid containing vehicle cooked at 250° C. for periods of 30 minutes will set up to an infusible gel. This minimum cooking time at the requisite "gas-proofing" temperature is barely sufficient to produce a tung oil or tung oil fatty acid containing vehicle the films of which will exhibit "gas-proofness." Methods of circumventing the premature gelling of tung oil or tung oil fatty acid containing vehicles during cooking have been devised and are known to practitioners of the paint and varnish cooking art. One method is to cook the resin and tung oil in two separate stages so that the preponderance of the vehicle cooking is done in the first stage and prior to the addition of the tung oil or tung oil fatty acid components. However, since the minimum requisite temperature for "gas-proofing" the tung oil component is still necessary, even in the two stage cook, this method of circumventing premature gelation is neither attractive nor without risk.

A second method of cooking tung oil or tung oil fatty acid containing vehicles involves carrying out the cook in an inert solvent (xylene, for example). The cooking schedule in the case of a "solvent cook" may be lengthened considerably without danger of premature gelation and for this reason the requisite minimum temperature for "gas-proofing" may be lowered somewhat. However, due to the relatively slow rate at which conjugated fatty acids esterify, "solvent cooking" is not attractive for the preparation of tung oil or tung oil fatty acid containing vehicles.

Still another method of cooking tung oil or tung oil fatty acid containing vehicles involves the use of the methyl esters of tung oil fatty acids. The tung oil fatty acids in this case are incorporated into the vehicle via an ester interchange reaction. Here again, the slow rate of ester interchange in the case of conjugated unsaturated fatty acid esters detracts from the method as applied to tung oil vehicles.

Prior to the development of the processes of this invention, vic-epoxy resin esters containing tung oil were undercooked (not "gas-proof"), or if sufficiently cooked by the judicious use of a modified cooking schedule, the acid number of the finished resin ester was excessively high due to the slow rate of esterification or ester interchange between the epoxy resins and the tung oil fatty acids. The presence of free fatty acids in finished vehicles is known to result in protective coating films that exhibit poor water and alkali resistance. Vehicles that contain residual free fatty acid are obviously unsuited for use in enamels that require reactive pigments (aluminum, zinc oxide and lead carbonate, for example).

In accordance with the present invention small amounts (not more than 1% by weight based on the solids content of the vehicle) of zinc resinate in combination with certain modifications of known methods of cooking tung oil and tung oil fatty acid containing vehicles can be used to produce "gas-proof" air drying vic-epoxy resin esters containing tung oil fatty acids in amounts as high as 0.5 equivalent of tung oil fatty acids per one equivalent of epoxide.

The use of metal resinates as paint and varnish vehicle cooking modifiers (gel disperser) is known. However, for gel dispersion large amounts of metal resinate must be employed (at least 25% by weight based on the tung oil used). This amount of metal resinate is disadvantageous for the reason that the resinate in any amount exceeding catalytic amounts markedly slows the drying of paint and varnish films. Certain special formulations can be employed to overcome this result in some measure (see, for example, Serial No. 538,538, filed October 4, 1955).

The use of zinc resinate in catalytic amounts in the process of the instant invention, it should be noted, is not for the purpose of "controlling" the cook (gel dispersion). The amount employed is far too low and in fact is of an altogether different order of magnitude than the amount required for control cooking. The present invention utilizes catalytic amounts of zinc resinate for the quite different and entirely unobvious purpose of catalyzing the esterification of fatty acids and epoxide. Because the requisite amount of zinc resinate for the process of this invention is less than 1% by weight based on the solids content of the finished vehicle, the slow air drying properties characteristic of the films from vehicles "control" cooked using large amounts of metal resinates is avoided.

The use of catalytic amounts of zinc resinate as an esterification promoter permits easy incorporation of tung oil fatty acids into epoxy resins by means of any of several modifications of known methods of cooking tung oil or tung oil fatty acid containing vehicles.

One modified method for cooking tung oil or tung oil fatty acid containing vehicles is based upon the substitution of a portion of the tung oil or tung oil fatty acid with a less reactive long chain fatty acid. The vehicle is then cooked in two separate stages with the tung oil being added during the second cooking stage. This method has as its object the reduction of the tendency of tung oil containing vehicles to gel prematurely during preparation. This particular modified cook is unattractive without zinc resinate catalyst because esterification of highly unsaturated fatty acids and particularly conjugated unsaturated fatty acids proceeds much more slowly than does the esterification of the more saturated fatty acids. Without zinc resinate catalyst this modified cook for tung oil and tung oil fatty acid containing vehicles leads inevitably either to premature gelation or undercooking and the production of a finished vehicle which possesses a high content of free fatty acid. Protective coatings prepared from vehicles with high residual free fatty acid exhibit notoriously poor resistance to water and to alkali.

It has been found that dilution of a portion of the tung oil fatty acids with less reactive long chain fatty acids (dehydrated castor oil fatty acids or tall oil fatty acids, for example), combined with a two stage cooking procedure carried out in the presence of catalytic amounts of zinc resinate is an eminently satisfactory method for obtaining "gas-proof" tung oil fatty acid containing vehicles with low residual acid number. One embodiment of this invention involves charging all of the vic-epoxide and one half of the long chain fatty acids (the less reactive fatty acids) to the reactor in the first cooking stage.

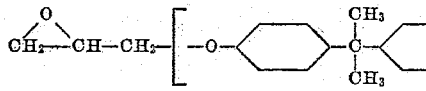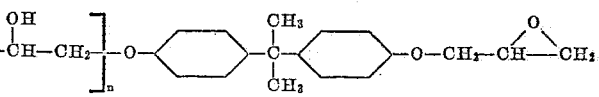

The first cooking stage is carried out until the epoxide ester attains a low acid number (less than 1.0). Typically, less than 60 minutes at 260° C. is required to reduce the acid number of the epoxide ester to 1.0 or below. Following the first cooking stage, the cook is cooled to about 220° C. and the remainder of the long chain fatty acids (including all of the tung oil fatty acids) is added, and the mixture is reheated to 235° C. and held at this temperature until the desired viscosity and the desired fatty acid number is attained. The cook is then ready to be cooled and thinned. Zinc resinate employed as a catalyst is added at either the first or second cooking stage.

The use of an inert cooking medium in combination with catalytic amounts of zinc resinate is another method that can be employed for the preparation of epoxy tung oil fatty acid esters. The use of an inert cooking medium ("solvent cooking") comprises a conventional vehicle cook with sufficient inert solvent (xylene) added to control the cooking reaction at a reflux temperature of 220° to 225° C. Light colored vehicles with residual acid numbers below 10 can be obtained with ease by means of "solvent" cooking in combination with zinc resinate catalyst. The conjugated fatty acids esterify slowly and small amounts of zinc resinate have been found to be particularly effective as a catalyst for esterification of tung oil fatty acids in solvent cooking.

Tung oil methyl esters, made by the methanolysis of tung oil, together with catalytic amounts of zinc resinate constitute still another method that can be employed to produce vic-epoxy resin esters of exceptionally low acid number. Dehydrated castor oil fatty acids are used in the first stage of a two stage cook, and tung oil methyl esters with catalytic amounts of zinc resinate added to function as an ester exchange catalyst are used in the second cooking stage. Epoxy esters with acid numbers below 1.0 are easily prepared by this method. Solvent cooking, in combination with tung oil methyl esters and zinc resinate catalyst is still another useful means of incorporating tung oil fatty acids into epoxy resins.

The prior art affords some examples of vic-epoxy resin esters containing tung oil or tung oil fatty acids the utility for which resins is claimed to be the production of protective coating films. These prior art examples will, however, be recognized by those skilled in the art as representing "undercooked" tung oil resin esters that are not "gas-proof" and that, furthermore, require powerful catalysts such as boron trifluoride or derivatives of boron trifluoride in order to function as film formers.

The highly reactive triene structure responsible for many of the desirable properties imparted to surface coatings by tung oil and tung oil fatty acids causes the oil and its acids to be so reactive that conventional processing techniques are not feasible. Unless modified methods and special precautions are taken, premature gelation of the tung oil or tung oil fatty acid containing vehicle will occur during the preparation and before "gas-proofness" has been achieved. A vehicle that is not "gas-proof" will not dry to a clear, smooth, glossy film under adverse conditions (e.g., in an atmosphere deficient in oxygen and contaminated with acidic gases such as carbon dioxide). Prior efforts to incorporate substantial amounts of tung oil fatty acids in epoxy resins have been notably unsuccessful.

Coating films of vic-epoxy resins, reaction products of epichlorohydrins and bisphenol, are characterized by outstanding adhesion and hardness. One such epoxy resin is Epon 1004, disclosed in Technical Publication S-C, pages 54-56, of the Shell Chemical Corporation. This resin melts at 100° C. and is reported to have an epoxide equivalent of 870 to 1025 and an equivalent weight of 175.

Further information concerning the Epon resins can be found in the article by Mika, J. Applied Chem., September 1956, page 374.

Tung oil fatty acids contain 76% triene conjugation present as oleostearic acid. Incorporated into epoxy resins, tung oil fatty acids contribute fast drying, extremely hard films, and marked increase in water, alkali, and organic solvent resistance.

The use of zinc resinate in amounts sufficient for catalytic purposes but insufficient to alter the cook and to impair the air-drying time of the coating films contributes to rapid esterification of the conjugated unsaturated fatty acids with resultant low residual fatty acid in the finished vehicles. In addition, the presence of trace amounts of zinc resinate enhances the pigment wetting properties of vehicles cooked therewith.

The instant invention is illustrated by the following specific examples, but it will be understood that the invention is not limited to these examples.

Example 1

Epon 1004 (120 parts by weight), tung oil fatty acids (80 parts by weight) and zinc resinate (1 part by weight) were heated at 235° C. for 27 minutes. The product set up as an infusible gel. The acid number of the product at the end of 27 minutes of cooking was 15.8.

Example 2

Epon 1004 (120 parts by weight) and dehydrated castor oil fatty acids (40 parts by weight) were heated together at a temperature of 260° C. At the end of 35 minutes the acid number of the heated mix had dropped to 0.66, heating was discontinued and the temperature was allowed to drop to 220° C. When the temperature had reached 220° C., tung oil fatty acids (40 parts by weight) were added and the resulting mix heated for 25 minutes at 260° C. The mix was then cooled and thinned with xylene to a solids content of 50% by weight. Prior to thinning with xylene the acid number of the mix was 15.4. Subsequent to thinning with xylene the viscosity of the mix was W–X on the Gardner-Holdt scale (12 poises). Cobalt drier in the form of cobalt naphthenate was incorporated into the xylene thinned mix and films 3 mils in thickness were subjected to drying time tests using a Reichhold drying time recorder. A 3 mil thick film with 0.05% cobalt drier added, dried in 3 hours and 40 minutes. A 3 mil thick film with 0.03% cobalt added, dried in 15 minutes.

An 8-inch borosilicate glass test tube was dipped into the thinned vehicle and the vehicle film deposited on the outer surface of the test tube was dried. The dried, film coated test tube was then dipped into a 10% aqueous alkali solution at room temperature for the purpose of testing the alkali resistance of the film. A film of the vehicle prepared as above withstood the aqueous alkali test for only 3 hours before failing.

Example 3

Epon 1004 (120 parts by weight) and dehydrated castor oil fatty acids (40 parts by weight) were heated together at a temperature of 260° C. At the end of 35 minutes the acid number of the heated mix had dropped to 0.3, heating was discontinued and the temperature was allowed to drop to 220° C. When the temperature had reached 220° C., tung oil fatty acids (40 parts by weight) and zinc resinate (1 part by weight) were added and the resulting mix heated for 45 minutes at 235° C. The mix was then cooled and thinned with xylene to a solids content of 50% by weight. Prior to thinning with xylene the acid number of the mix was 6.4. Subsequent to thinning with xylene the viscosity of the mix was W–X on the Gardner-Holdt scale (12 poises). Cobalt drier in the form of cobalt naphthenate was incorporated into the xylene thinned mix and films 3 mils in thickness were subjected to drying time tests using a Reichhold drying time recorder. A 3 mil thick film with 0.05% cobalt added dried in 25 minutes. A 3 mil thick film with 0.03% cobalt added dried in 3 hours and 15 minutes.

Films of the vehicle prepared as above withstood the aqueous alkali test described in Example 1 for 45 hours before failing.

A baked film of this vehicle (baked 30 minutes at 150° C.) withstood the alkali test described in Example 1 for 10 days. With 20% by weight of melamine added a baked film (baked 30 minutes at 150° C.) withstood the alkali test for 14 days.

The dried films of tung oil fatty acid containing vehicles showed extreme hardness. Air dried films of the vehicle of this example measured 40–45 by the Sward hardness rocker test (glass=100). A similarly prepared vehicle containing dehydrated castor oil fatty acids alone produced air dried films that measured 30–35 on the Sward hardness rocker. Conventional alkyl resins yield films that measure 15–20.

Vehicles were prepared as described above except that 0.25 part by weight of zinc resinate was employed rather than 1 part by weight. The acid number of the vehicles so prepared with the lesser amount of zinc resinate, after 45 minutes cooking time, still exhibited acid numbers above 16.0.

Vehicles were prepared as described above except that 8 parts by weight of zinc resinate was used instead of 1 part by weight. The acid number of the finished vehicles using the larger amount of zinc resinate (8 parts by weight) were distinctly higher than those obtained using the 1 part by weight of zinc resinate. The larger amount of zinc resinate, in addition, lengthened the drying time of the coating films of the vehicles so prepared.

Example 4

The xylene thinned vehicle of Example 3 (80 parts by weight) and melamine (20 parts by weight) were mixed together to produce a baking varnish film. Films 3 mils in thickness were cast on tin plate test panels and baked for 30 minutes at 150° C. The resulting baked films were extremely tough, flexible, and adhered exceptionally well to the test panels. The test panels with baked on films were bent over a mandrel ⅛ inch in diameter without evidence of film failure. The baked films were resistant to weak solvents such as xylene and mineral spirits and were equal to those of Example 2 with respect to aqueous alkali resistance. In addition, the baked melamine containing films exhibited unusual resistance to the more powerful organic solvents. The baked films withstood ethyl acetate for 4 hours and methyl isobutyl ketone for 5 hours.

Example 5

The xylene thinned vehicle of Example 3 (83.8 parts by weight) and titanium dioxide (22.5 parts by weight) were ground together in a laboratory mill for 10 minutes (equivalent to 10 hours in a commercial ball mill). After thorough dispersal ("grinding-in") of the titanium dioxide pigment, 55 grams of melamine was incorporated into the pigmented vehicle. Films 3 mils in thickness of the enamel thusly prepared were baked for 30 minutes at 150° C. The baked enamel films were equal to the films of Examples 2 and 7 with respect to toughness, flexibility, adherence to the protected surface, and aqueous alkali resistance. In addition, the baked enamel films withstood the action of ethyl acetate for 3 days and the action of methyl isobutyl ketone for 3 days.

Example 6

Epon 1004 (120 parts by weight) and tall oil fatty acids (40 parts by weight) were heated together at a temperature of 260° C. At the end of 60 minutes the acid number of the heated mix had dropped to 0.25, heating was discontinued and the temperature was allowed to drop to 220° C. When the temperature had reached 220° C., tung oil fatty acids (40 parts by weight) were added and the resulting mix heated for 35 minutes at 230°–235° C. The mix was then cooled and thinned with xylene to a solids content of 50% by weight. Prior to thinning with xylene the acid number of the mix was 16.4. Subsequent to thinning with xylene the viscosity of the mix was J–K on the Gardner-Holdt scale (2.6 poises). Cobalt drier in the form of cobalt naphthenate was incorporated into the xylene thinned mix and films 3 mils in thickness were subjected to drying time tests using a Reichhold drying time recorder. A 3 mil thick film with 0.03% cobalt added dried in 3 hours and 40 minutes. A 3 mil thick film with 0.04 cobalt added dried in 50 minutes.

Example 7

Epon 1004 (120 parts by weight) and tall oil fatty acids (40 parts by weight) were heated together at a temperature of 260° C. At the end of 60 minutes the acid number of the heated mix had dropped to 0.3, heating was discontinued and the temperature was allowed to drop to 220° C. When the temperature had reached 220° C., tung oil fatty acids (40 parts by weight) and zinc resinate (1 part by weight) were added and the resulting mix heated for 45 minutes at 230°–235° C. The mix was then cooled and thinned with xylene to a solids content of 50% by weight. Prior to thinning with xylene the acid number of the mix was 6.8. Subsequent to thinning with xylene the viscosity of the mix was P–Q on the Gardner-Holdt scale (4.2 poises). Cobalt drier in the form of cobalt naphthenate was incorporated into the xylene thinned mix and films 3 mils in thickness were subjected to drying time tests using a Reichhold drying time recorder. A 3 mil thick film with 0.02% cobalt added dried in 1 hour and 25 minutes.

*Example 8*

Epon 1004 (120 parts by weight), tung oil fatty acids (40 parts by weight), dehydrated castor oil fatty acids (40 parts by weight), zinc resinate (1 part by weight) and sufficient xylene (approximately 15 parts by weight) to control the reflux temperature at from 220° to 225° C. were heated until the acid number of the heated mixture was below 10.0 on a solvent-free basis. The mixture was then cooled and thinned with additional xylene to a solids content of 50% by weight. The air dried films of this vehicle with 0.03% by weight of cobalt added and the baking films of this vehicle were equal in all respects to those of the vehicle of Example 3.

*Example 9*

Epon 1004 (120 parts by weight), tung oil fatty acids (40 parts by weight), tall oil fatty acids (40 parts by weight), zinc resinate (1 part by weight) and sufficient xylene (approximately 15 parts by weight) to control the reflux temperature at from 220° to 225° C. were heated together at reflux. After 90 minutes, the acid number of the heated mixture was below 8.5 on a solvent-free basis. The mixture was then cooled and thinned with addititional xylene to a solids content of 50% by weight. The viscosity of the thinned vehicle was T–U on the Gardner-Holdt scale (6 poises). The air dried films of this vehicle and the baked films of this vehicle were equal in all respects to those of the vehicle of Example 3.

*Example 10*

Epon 1004 (120 parts by weight) and dehydrated castor oil fatty acids (30 parts by weight) were heated together at a temperature of 260° C. At the end of 1 hour the acid number of the heated mix had dropped to 0.13. The temperature was then allowed to drop to 220° C. When the temperature had reached 220° C. tung oil methyl esters (50 parts by weight) and zinc resinate (1 part by weight) were added and the resulting mix heated at 235° C. for 25 minutes. The mixture was then cooled and thinned with xylene to a solids content of 50% by weight. Prior to thinning with xylene the acid number of the mix was 0.26. Subsequent to thinning wtih xylene the viscosity of the thinned mix was O–P on the Gardner-Holdt scale (3.85 poises). Cobalt drier in the form of cobalt naphthenate was incorporated into the xylene thinned mix and films 3 mils in thickness were subjected to drying time tests. A film 3 mils in thickness containing 0.03% cobalt dried in 1 hour and 15 minutes.

*Example 11*

Epon 1004 (120 parts by weight), tung oil fatty acid methyl esters (50 parts by weight), dehydrated castor oil fatty acids (30 parts by weight), zinc resinate (1 part by weight) and sufficient xylene to control the temperature of reflux at 220° to 225° C. (approximately 15 parts by weight) were heated together until the acid number of the mixture was less than 0.2 on a solvent-free basis (approximately 60 minutes). The mixture was then cooled and thinned with additional xylene to a solids content of 50% by weight. The finished vehicle had a viscosity of H–I on the Gardner-Holdt scale (2.0 poises).

*Example 12*

Epon 1004 (120 parts by weight), tung oil fatty acid methyl esters (40 parts by weight), tall oil fatty acids (40 parts by weight), zinc resinate (1 part by weight) and sufficient xylene (approximately 15 parts by weight) to control the reflux temperature at from 220° to 225° C. were heated together until the acid number of the heated mixture was 1.5 on a solvent-free basis (approximately 2 hours). The heated mixture was then cooled and thinned with additional xylene to a solids content of 50% by weight. The viscosity of the finished vehicle was I–J on the Gardner-Holdt scale (2.3 poises).

*Example 13*

Epon 1004 (120 parts by weight), dehydrated castor oil fatty acids (80 parts by weight), and zinc resinate (1 part by weight) were heated together at a temperature of 260° C. for 120 minutes. The heated mixture was then cooled and thinned with xylene to a solids content of 50% by weight. The viscosity of the xylene thinned mixture was N–O on the Gardner-Holdt scale (3.5 poises). The acid number of the finished vehicle was 5.0 on a solvent-free basis.

*Example 14*

Epon 1004 (120 parts by weight), tall oil fatty acids (80 parts by weight) and zinc resinate (1 part by weight) were heated at a temperature of 260° C. for 90 minutes. The heated mixture was then cooled and thinned with xylene to a solids content of 50% by weight. The viscosity of the finished vehicle was F–G on the Gardner-Holdt scale (1.5 poises). The acid number of the finished vehicle was 1.1 on a solvent-free basis.

*Example 15*

Epon 1004 (120 parts by weight), dehydrated castor oil fatty acids (80 parts by weight), zinc resinate (1 part by weight) and sufficient xylene to control the reflux temperature at 220° to 225° C. were heated together for 120 minutes. The mixture was then cooled and thinned with additional xylene to a 50% solids content by weight. The viscosity of the finished vehicle was H–I on the Gardner-Holdt scale (2.0 poises). The acid number of the finished vehicle was 3.6 on a solvent-free basis.

We claim:

1. A process for incorporating tung oil fatty acids in vic-epoxy resins comprising heating together equivalent weights of a vic-epoxy resin and a mixture comprising a member of the group consisting of dehydrated castor oil fatty acids and tall oil fatty acids and a member of the group consisting of tung oil fatty acids and their methyl esters together with from trace amounts to about 1% zinc resinate and sufficient xylene to maintain the temperature at about from 220° to 225° C. until the viscosity of the product when cooled to room temperature and diluted to 50% solids with additional xylene is within the range of 2.6 to 12 poises.

2. The process of claim 1 wherein the vic-epoxy resin is heated with a mixture of dehydrated castor oil fatty acids and tung oil fatty acids.

3. The process of claim 1 wherein the vic-epoxy resin is heated with a mixture containing tall oil fatty acids and tung oil fatty acids.

4. The process of claim 1 wherein the vic-epoxy resin is heated with a mixture containing dehydrated castor oil fatty acids and tung oil fatty acids methyl esters.

5. The process of claim 1 wherein the vic-epoxy resin is heated with a mixture containing tall oil fatty acids and tung oil fatty acids methyl esters.

6. A process for incorporating tung oil fatty acids in vic-epoxy resins comprising heating together at a temperature of about 260° C. a mixture of a vic-epoxy resin and a member of the group consisting of dehydrated castor oil fatty acids and tall oil fatty acids until the acid number of the heated mixture is below 1.0, cooling the heated mixture to 220° C., adding to the cooled mixture about 1 percent by weight of zinc resinate and a member of the group consisting of tung oil fatty acids and the methyl esters thereof, and heating the resulting mixture at a temperature of about 235° C.

7. A process for the incorporation of tung oil fatty acids in vic-epoxy resins comprising heating together at a temperature of 260° C., a mixture of 120 parts by weight of a vic-epoxy resin and 40 parts by weight of dehydrated castor oil fatty acids until the acid number of the heated mixture is below 1.0, cooling the heated mixture to 220° C., adding to the cooled mixture 40 parts by weight of tung oil fatty acids and 1 part by weight of zinc resinate, and heating the resulting mixture at a temperature of 235° C. for at least 45 minutes.

8. A protective coating vehicle comprising the product of claim 7 thinned to 50% solids content with xylene.

9. A baking varnish consisting of 80 parts by weight of the vehicle of claim 3 blended with 20 parts by weight of melamine.

10. A baking enamel consisting of 80 parts by weight of the vehicle of claim 8, 25 parts by weight of pigment, and 50 parts by weight of melamine.

11. A process for the incorporation of tung oil fatty acids in vic-epoxy resins which comprises heating together at a temperature of 260° C., a mixture of 120 parts by weight of a vic-epoxy resin and 40 parts by weight of tall oil fatty acids until the acid number of the heated mixture is below 1.0, cooling the heated mixture to 220° C., adding to the cooled mixture 40 parts by weight of tung oil fatty acids and 1 part by weight of zinc resinate, and heating the resulting mixture at a temperature of 235° C. for at least 45 minutes.

12. A protective coating vehicle comprising the product of claim 11 thinned to 50% solids content with xylene.

13. A process for the incorporation of tung oil fatty acids in vic-epoxy resins which comprises heating together at a temperature of 260° C., a mixture of 120 parts by weight of a vic-epoxy resin and 40 parts by weight of dehydrated castor oil fatty acids until the acid number of the heated mixture is below 1.0, cooling the heated mixture to 220° C., adding to the cooled mixture 40 parts by weight of tung oil fatty acid methyl esters, and 1 part by weight of zinc resinate, and heating the resulting mixture at a temperature of 235° C. for at least 45 minutes.

14. A process for the incorporation of tung oil fatty acids in vic-epoxy resins which comprises heating together at a temperature of 260° C., a mixture of 120 parts by weight of a vic-epoxy resin and 40 part by weight of tall oil fatty acids until the acid number of the heated mixture is below 1.0, cooling the heated mixture to 220° C., adding to the cooled mixture 40 parts by weight of tung oil fatty acid methyl esters and 1 part by weight of zinc resinate, and heating the resulting mixture at a temperature of 235° C. for at least 45 minutes.

References Cited in the file of this patent

UNITED STATES PATENTS

| | | |
|---|---|---|
| 1,805,473 | Adams | May 19, 1931 |
| 2,483,726 | Floyd | Oct. 4, 1949 |
| 2,500,765 | Montague | Mar. 14, 1950 |
| 2,596,737 | Tess et al. | May 13, 1952 |
| 2,627,483 | Dowd | Feb. 3, 1953 |
| 2,698,308 | Crecelius | Dec. 28, 1954 |
| 2,867,591 | Lederman | Jan. 6, 1959 |
| 2,877,195 | McNabb | Mar. 10, 1959 |

OTHER REFERENCES

Jordan: "Oils For the Paint Industry" (Guilford & Co., Ltd; 1951), pages 173 and 242.

Jungnickel et al.: "Organic Analysis," volume 1, New York, 1953, pages 127–148; pages 127–8 specially relied on.

Goldblatt et al.: Ind. Eng. Chem., 49, 1099 (July 1957).